US011472663B2

(12) United States Patent
Marpu et al.

(10) Patent No.: US 11,472,663 B2
(45) Date of Patent: Oct. 18, 2022

(54) AUTOMATIC SOFTWARE UPGRADE ASSISTANT FOR REMOTE ELEVATOR MONITORING EXPERTS USING MACHINE LEARNING

(71) Applicant: Otis Elevator Company, Farmington, CT (US)

(72) Inventors: Appalaraju Marpu, Telangana (IN); Naveen Kumar Yeddi, Telangana (IN); Gopala Rao Vulli, Hyderabad (IN); Veeranjaneyulu Manyam, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 542 days.

(21) Appl. No.: 16/585,488

(22) Filed: Sep. 27, 2019

(65) Prior Publication Data
US 2020/0102185 A1 Apr. 2, 2020

(30) Foreign Application Priority Data
Oct. 1, 2018 (IN) .............................. 201811036996

(51) Int. Cl.
*G06F 8/65* (2018.01)
*B66B 1/34* (2006.01)
*G06N 20/00* (2019.01)

(52) U.S. Cl.
CPC .......... *B66B 1/3461* (2013.01); *B66B 1/3423* (2013.01); *G06F 8/65* (2013.01); *G06N 20/00* (2019.01)

(58) Field of Classification Search
CPC ... B66B 1/3461; B66B 1/3423; B66B 1/3407; G06F 8/65; G06N 20/00
See application file for complete search history.

(56) References Cited

U.S. PATENT DOCUMENTS 9,213,473 B2 12/2015 Hovi et al.
9,734,693 B2 8/2017 Mckinley et al.
(Continued)

FOREIGN PATENT DOCUMENTS

CN 103677946 A 3/2014
CN 102765643 B 6/2015
(Continued)

OTHER PUBLICATIONS

Extended Eurpoean Search Report for Application No. 19200924.9, dated Feb. 28, 2020, 6 pages.
(Continued)

*Primary Examiner* — Daxin Wu
(74) *Attorney, Agent, or Firm* — Cantor Colburn LLP

(57) ABSTRACT

A system for providing an automatic software upgrade assistant for remote elevator monitoring experts using machine learning. The system performs operations that include receiving a request from a requestor to install a software upgrade on a controller of an elevator component, the software upgrade dependent on at least one software program being installed on the controller. It is determined whether the at least one software program is installed on the controller. Based at least in part on determining that the at least one software program is installed on the controller: an elapsed time to complete the installation of the software upgrade on the controller is predicted; and an indication is output to the requestor that the software upgrade is permitted to be installed on the controller and the predicted elapsed time to complete the installation.

18 Claims, 4 Drawing Sheets

(56) References Cited

U.S. PATENT DOCUMENTS

| | | | | |
|---|---|---|---|---|
| 10,812,562 | B1* | 10/2020 | Mitchell | H04L 65/80 |
| 2012/0084766 | A1* | 4/2012 | Shanmugam | H04L 67/04 |
| | | | | 717/173 |
| 2017/0052536 | A1 | 2/2017 | Warner et al. | |
| 2017/0144858 | A1* | 5/2017 | Gandhi | B66B 1/3407 |
| 2017/0355554 | A1* | 12/2017 | Eleid | B66B 1/2458 |
| 2017/0364821 | A1* | 12/2017 | Mathur | G01C 21/26 |
| 2018/0086597 | A1 | 3/2018 | Song et al. | |
| 2018/0162685 | A1 | 6/2018 | Mustonen et al. | |
| 2020/0089814 | A1* | 3/2020 | Palus | G06F 16/955 |
| 2021/0011711 | A1* | 1/2021 | Ogawa | G06F 8/62 |

FOREIGN PATENT DOCUMENTS

| | | | | |
|---|---|---|---|---|
| CN | 105731209 | A | 7/2016 | |
| CN | 105955784 | A | 9/2016 | |
| CN | 106144819 | A | 11/2016 | |
| CN | 106256750 | A | 12/2016 | |
| CN | 104973466 | B | 1/2017 | |
| CN | 107194053 | A | 9/2017 | |
| CN | 108446128 | A | 8/2018 | |
| EP | 2916219 | A1 * | 9/2015 | G06F 8/64 |
| EP | 2916219 | A1 | 9/2015 | |
| JP | 2010180004 | A | 8/2010 | |
| JP | 2011241016 | A | 12/2011 | |
| JP | 2017007799 | A1 | 1/2017 | |
| JP | 6203332 | B1 | 9/2017 | |
| WO | 2016180484 | A1 | 11/2016 | |
| WO | WO-2016180484 | A1 * | 11/2016 | B66B 1/34 |
| WO | 2018014502 | A1 | 1/2018 | |
| WO | WO-2018179600 | A1 * | 10/2018 | B66B 1/14 |

OTHER PUBLICATIONS

Suarez, A. et al. "Design of an Elevaotr Monitoring Application using Internet of Things", International Journal of Applied Engineering Reasearch, 2018, vol. 13, No. 6, pp. 4195-4202.

Uusitalo, J. "Novel Sensor Solutions with Application to Monitoring of Elevaor Systems", Tempere University of Technology, Master of Science Thesis, Feb. 2018, Master's Degree Programme in Electrical Engineering, 76 Pages.

Examination Report for Application No. 201811036996 dated Jun. 1, 202, 5 pages.

Chinese Office Action for Application No. 20191093365.9 dated Jul. 14, 2021, 5 pages.

* cited by examiner

US 11,472,663 B2

AUTOMATIC SOFTWARE UPGRADE ASSISTANT FOR REMOTE ELEVATOR MONITORING EXPERTS USING MACHINE LEARNING

CROSS-REFERENCE TO RELATED APPLICATIONS

This application claims the benefit of Indian Application No. 201811036996 ed Oct. 1, 2018, which is incorporated herein by reference in its entirety.

BACKGROUND

The subject matter disclosed herein relates to the field of upgrading elevator software, and more particularly relates to an automatic software upgrade assistant for remote elevator technicians using machine learning (ML).

The planning of a software upgrade for a component of an elevator requires coordination of multiple items related to both the specific software being upgraded and to a convenient time to perform the software upgrade. It can take elevator technicians a lot of time and require them to access multiple systems and talk to multiple people in an attempt to obtain answers to even just a few of the questions that ideally should be answered prior to performing a software upgrade of a component of an elevator. For example, the elevator technician should find out whether there are any other components which also have software and/or hardware which needs to be upgraded at the same time as the intended component, and how much time it will take to complete the software upgrade in order to plan other activities accordingly. In addition, it would be helpful if the elevator technician knows if a software upgrade of any other elevator component is triggered for the same elevator at the same scheduled time or the same on-demand time by another elevator technician. Further, it would be helpful if the elevator technician knew before scheduling the software upgrade whether there is any activity planned in the building (e.g., by the building management team) which may impact the software upgrade for the elevator, and whether the elevator is expected to be idle at the time that the software upgrade is planned to occur. Additionally, it would be good for the elevator technician to verify that the component health condition is good.

BRIEF SUMMARY

According to an embodiment, a system configured to perform automatic software upgrade assistance for remote elevator monitoring experts using machine learning is provided. The system includes a processor and a memory that includes computer-executable instructions that, when executed by the processor, cause the processor to perform operations. The operations include receiving a request from a requestor to install a software upgrade on a controller of an elevator component, the software upgrade dependent on at least one software program being installed on the controller. It is determined whether the at least one software program is installed on the controller. Based at least in part on determining that the at least one software program is installed on the controller: an elapsed time to complete the installation of the software upgrade on the controller is predicted; and an indication is output to the requestor that the software upgrade is permitted to be installed on the controller and the predicted elapsed time to complete the installation.

In addition to one or more of the features described herein, or as an alternative, further embodiments of the system may include that operations further include, based at least in part on determining that the at least one software program is installed on the controller: predicting an idle timeframe of an elevator comprising the elevator component; determining a suggested timeframe for performing the installation based at least in part on the idle time of the elevator; and outputting the suggested timeframe to the requestor.

In addition to one or more of the features described herein, or as an alternative, further embodiments of the system may include that the predicting an idle timeframe of the elevator is based at least in part on a machine learning model built based at least in part on past idle timeframes of the elevator.

In addition to one or more of the features described herein, or as an alternative, further embodiments of the system may include determining a suggested timeframe is further based at least in part on a software upgrade request from another requestor.

In addition to one or more of the features described herein, or as an alternative, further embodiments of the system may include that the determining a suggested timeframe is further based at least in part on planned activities in a building where the elevator is located.

In addition to one or more of the features described herein, or as an alternative, further embodiments of the system may include that the determining a suggested timeframe is further based at least in part on a current health status of the elevator component.

In addition to one or more of the features described herein, or as an alternative, further embodiments of the system may include that the predicting is based at least in part on a machine learning model built based at least in part on past elapsed times to complete installation of the software upgrade.

In addition to one or more of the features described herein, or as an alternative, further embodiments of the system may include that the operations further include, based at least in part on determining that the at least one software program is not installed on the controller, outputting to the requestor, an indication that the software upgrade is not permitted to be installed on the controller.

In addition to one or more of the features described herein, or as an alternative, further embodiments of the system may include that the operations further include, based at least in part on determining that the at least one software program is installed on the controller, initiating the software upgrade on the controller.

In addition to one or more of the features described herein, or as an alternative, further embodiments of the system may include that the software upgrade is further dependent on at least one hardware element on the component or the controller.

According to an embodiment, a method of automatic software upgrade assistance for remote elevator monitoring experts using machine learning is provided. The method includes receiving a request from a requestor to install a software upgrade on a controller of an elevator component, the software upgrade dependent on at least one software program being installed on the controller. It is determined whether the at least one software program is installed on the controller. Based at least in part on determining that the at least one software program is installed on the controller: an elapsed time to complete the installation of the software upgrade on the controller is predicted; and an indication is output to the requestor that the software upgrade is permitted to be installed on the controller and the predicted elapsed time to complete the installation.

In addition to one or more of the features described herein, or as an alternative, further embodiments of the method may include, based at least in part on determining that the at least one software program is installed on the controller: predicting an idle timeframe of an elevator comprising the elevator component; determining a suggested timeframe for performing the installation based at least in part on the idle time of the elevator; and outputting the suggested timeframe to the requestor.

In addition to one or more of the features described herein, or as an alternative, further embodiments of the method may include that the predicting an idle timeframe of the elevator is based at least in part on a machine learning model built based at least in part on past idle timeframes of the elevator.

In addition to one or more of the features described herein, or as an alternative, further embodiments of the method may include determining a suggested timeframe is further based at least in part on a software upgrade request from another requestor.

In addition to one or more of the features described herein, or as an alternative, further embodiments of the method may include that the determining a suggested timeframe is further based at least in part on planned activities in a building where the elevator is located.

In addition to one or more of the features described herein, or as an alternative, further embodiments of the method may include that the determining a suggested timeframe is further based at least in part on a current health status of the elevator component.

In addition to one or more of the features described herein, or as an alternative, further embodiments of the method may include that the predicting is based at least in part on a machine learning model built based at least in part on past elapsed times to complete installation of the software upgrade.

In addition to one or more of the features described herein, or as an alternative, further embodiments of the method may include, based at least in part on determining that the at least one software program is not installed on the controller, outputting to the requestor, an indication that the software upgrade is not permitted to be installed on the controller.

In addition to one or more of the features described herein, or as an alternative, further embodiments of the method may include, based at least in part on determining that the at least one software program is installed on the controller, initiating the software upgrade on the controller.

In addition to one or more of the features described herein, or as an alternative, further embodiments of the method may include that the software upgrade is further dependent on at least one hardware element on the component or the controller.

Technical effects of embodiments of the present disclosure include the ability to provide analysis prior to performing a software upgrade of an elevator component which can improve the productivity of elevator technicians in making decisions about when to perform the software upgrade. Technical effects of embodiments of the present disclosure also include the ability to save time of remote elevator monitoring experts, or elevator technicians, by planning software upgrade activities properly. Technical effects of embodiments of the present invention also include being able to more accurately predict software upgrade completion times in order to plan other activities more accurately. Technical effects of embodiments of the present invention further include the avoidance of turn backs on software upgrades.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

One or more embodiments of the present disclosure provide an automatic software upgrade assistant for remote elevator technicians using machine learning (ML). As described previously, the ability to perform a successful software upgrade to a component of an elevator depends on the coordination of multiple intertwined items related to both the specific component having the software being upgraded and to the elevator as a whole. One or more embodiments described herein provide a software upgrade assistant to access and interpret data that may impact a proposed software upgrade. Based on the analysis, the software upgrade assistant provides a suggested time frame (s) for the software upgrade to a remote elevator technician. All or a subset of the data may be available and generated in the cloud and used by the software upgrade assistant to inform the remote elevator technician about the component and elevator data before triggering the software upgrade so that remote elevator technician can perform the software upgrade to the elevator component with a high probability that the upgrade will be successful. In accordance with one or more embodiments, ML is used to predict items such as how much time it will take to perform the software upgrade and when the elevator will be in an idle state, both of which are used by the software upgrade assistant to determine a suggested time frame.

As used herein, the terms "remote elevator monitoring expert" or "remote elevator technician" refer to an elevator technician who generally performs the software upgrade from a location that is remote from the elevator receiving the software upgrade. A remote elevator technician may occasionally be at the same site as the elevator, for example when diagnosing a problem with the elevator that could not be solved remotely.

Figure 1:
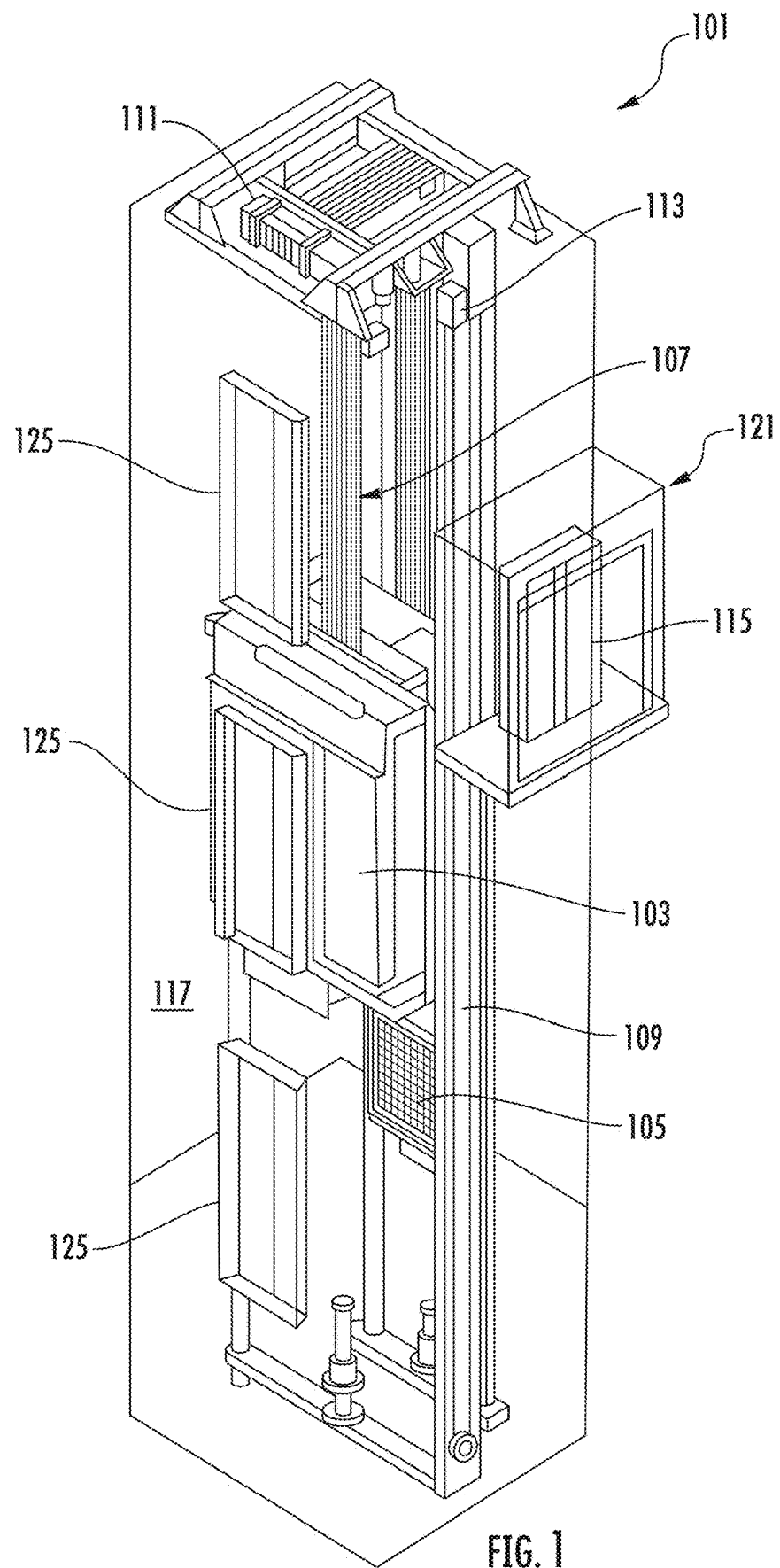
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1.

Figure 2:
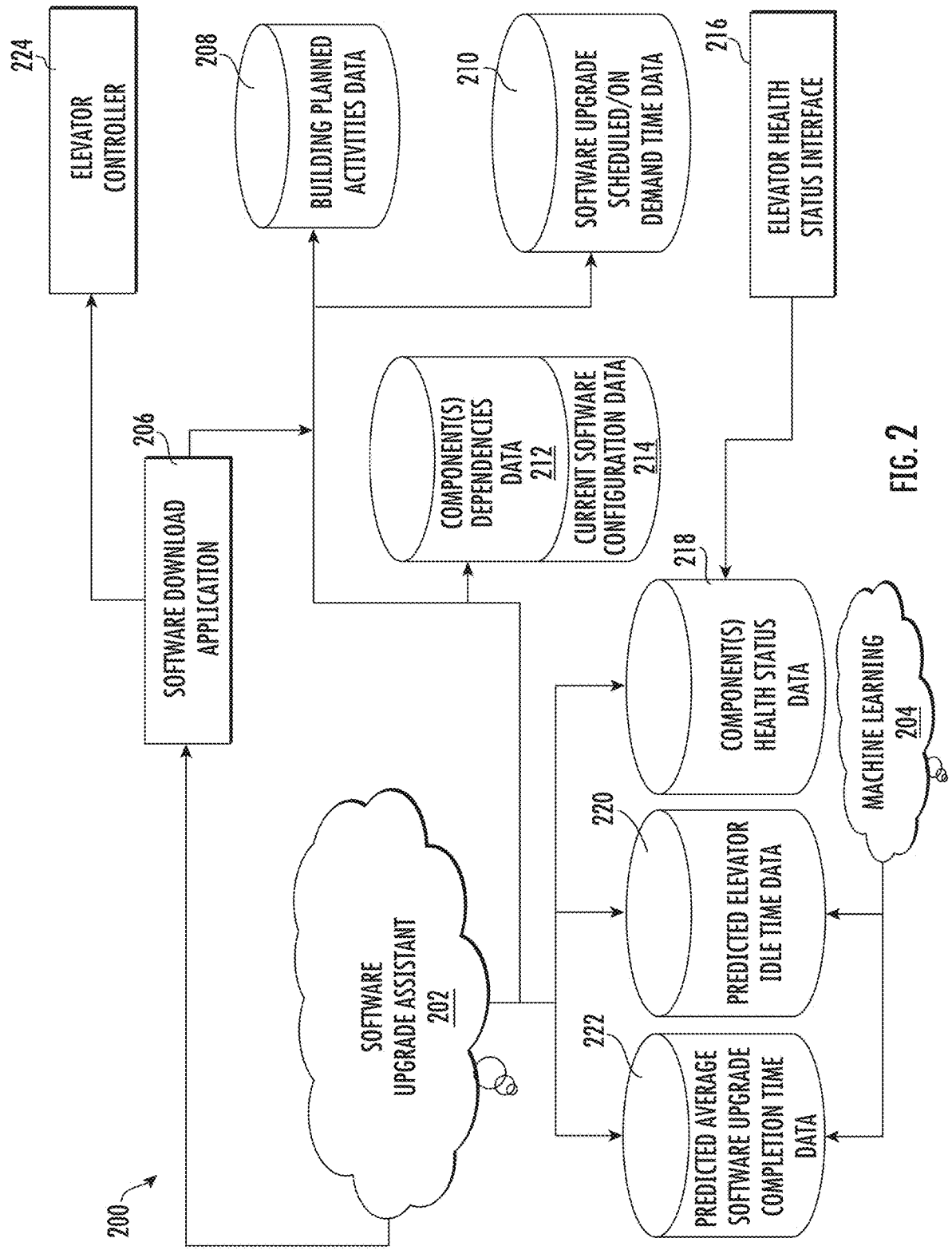
FIG. 2 is a schematic illustration of system for providing an automatic software upgrade assistant for elevator technicians using machine learning (ML) in accordance with one or more embodiments of the present disclosure.

Turning now to FIG. 2, a schematic illustration of a system 200 for providing an automatic software upgrade assistant 202 for remote elevator technicians using ML is generally shown in accordance with one or more embodiments of the present disclosure. The system 200 shown in FIG. 2 includes software upgrade assistant 202, machine learning module 204, software download application 206, building planned activities data 208, software upgrade scheduled/on-demand time data 210, component(s) dependencies data 212, current software configuration data 214, elevator health status interface 216, component(s) health status data 218, predicted elevator idle time data 220, and predicted average software upgrade completion time data 222.

In accordance with one or more embodiments, at least a subset of the building planned activities data 208, software upgrade scheduled/on-demand time data 210, component(s) dependencies data 212, and current software configuration data 214, are stored and maintained in the cloud. The building planned activities data 208 includes information about scheduled operations for the building such as, but not limited to planned power outages, fire drills, large meetings, gatherings, events, etc. In an embodiment, the building planned activities data 208 is input via a user interface and/or sourced from a building maintenance application or scheduling system. The software upgrade scheduled/on-demand time data 210 includes information about when the remote elevator technician would like to perform the software upgrade. In an embodiment, the data is input by the remote elevator technician via a user interface or scheduling interface or automatically detected from an electronic building calendar or occupants outlook calendars, etc.

The component(s) dependencies data 212 includes information about dependencies between software and upgrades to software executing on the elevator(s). In an embodiment, the dependency data is input by a user via a user interface and/or extracted from vendor provided documentation describing the dependencies. The current software configuration data 214 describes what software, including version numbers and possibly configuration details, is currently installed on components of the elevator(s). In an embodiment, the configuration data is input by a user via a user interface and/or extracted from a software configuration library.

In an embodiment, the component(s) health status data 218 includes a current status of the elevator(s) including what components, if any, are currently in an inactive mode. This data is received from elevator health status interface 216 which polls and collects status of the elevator(s). In an embodiment, the polling and collecting is via an elevator controller such as elevator controller 224. In an embodiment, component(s) health status data 218 is stored and maintained in the cloud. In another embodiment, the elevator health status interface 216 executes on a common platform interface board (CPIB) which communicates recently collected data to the component(s) health status data 218 on the cloud.

In an embodiment, the cloud also maintains the predicted average software upgrade completion time data 222 and the predicted elevator idle time data 220 which are both generated using ML modules 204 which are described in more detail below with respect to FIGS. 4 and 5. In an embodiment, all or a subset of the predicted average software upgrade completion time data 222 and the predicted elevator idle time data 220 are stored locally at the elevator. The predicted average software upgrade completion time data 222 is generated based on how long previous similar upgrades have taken, and the predicted elevator idle time data 220 is generated based on tracking previous patterns of idle times of the elevator(s). These idle times are good candidate time frames for performing software upgrades to components of the elevator(s).

Each of the building planned activities data 208, software upgrade scheduled/on-demand time data 210, component(s) dependencies data 212, current software configuration data 214, component(s) health status data 218, predicted elevator idle time data 220, and predicted average software upgrade completion time data 222 may be stored in the cloud in any one of or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.).

In an embodiment, access to the data stored in the cloud is via a managed Internet protocol (IP) network administered by a service provider. The network may be implemented in a wired or wireless fashion, e.g., using wireless protocols and technologies, such as WiFi, WiMax, cellular, satellite, etc. The network may also be a packet-switched network such as a local area network, wide area network, metropolitan area network, the Internet, or other similar type of network environment. The network may be a fixed wireless network, a wireless local area network (LAN), a wireless wide area network (WAN) a personal area network (PAN), a virtual private network (VPN), intranet or other suitable network system and may include equipment for receiving and transmitting signals.

The elevator controller 224 shown in FIG. 2 may be implemented, for example, by elevator controller(s) 115 of FIG. 1. In an embodiment, the software upgrade is installed on the elevator controller 224 by the remote elevator technician.

Each of the software upgrade assistant 202 and the machine learning module 204 may be implemented by a hardware device executing in the cloud and can include hardware instructions and/or software instructions. Each of the software upgrade assistant 202 and the machine learning module 204 may also be implemented by a local hardware device executing in proximity to the elevator or on a mobile device of the elevator technician. The processor may be a custom made or commercially available processor, a central processing unit (CPU), an auxiliary processor among several processors, a semiconductor based microprocessor (in the form of a microchip or chip set), a macroprocessor, or other device for executing instructions. In addition, the processor may include memory for storing software instructions and/or other data. The instructions in the memory may include one or more separate programs, each of which comprises an ordered listing of executable instructions for implementing logical functions.

It should be appreciated that, although particular elements are separately defined in the schematic block diagram of FIG. 2, each or any of the elements may be otherwise combined or separated via hardware and/or software.

Figure 3:
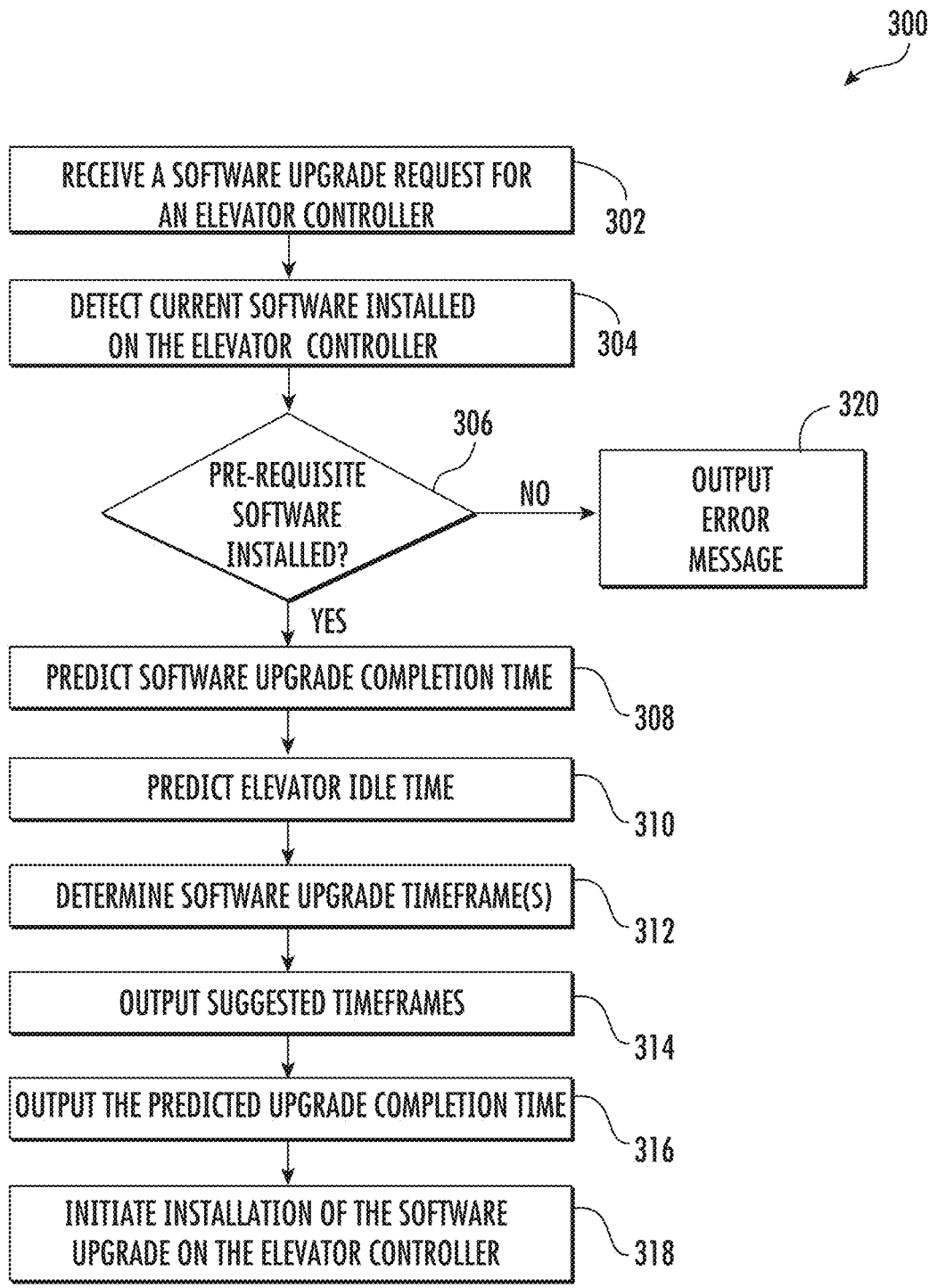
FIG. 3 is a flow diagram illustrating a method of providing an automatic software upgrade assistant using the system of FIG. 2 in accordance with one or more embodiments of the present disclosure.

Turning now to FIG. 3, a flow diagram 300 illustrating a method of providing an automatic software upgrade assistant using the system 200 of FIG. 2 is generally shown in accordance with one or more embodiments of the present disclosure. In an embodiment, the processing shown in FIG. 3 is performed by the software upgrade assistant 202 of FIG. 3. At block 302, a software upgrade for an elevator controller, such as elevator controller 224 of FIG. 2 is requested by a requestor, such as a remote elevator technician by entering the request via a user interface into the software upgrade scheduled/on-demand time data 210 of FIG. 2. At block 304 the current software installed on the elevator controller is detected, for example by querying current software configuration data 214.

At block 306, it is determined whether the pre-requisite software, or the software that the software upgrade is dependent on, is installed on the elevator controller or component. In an embodiment, the software pre-requisite(s) for the software upgrade is determined by querying the component(s) dependency data 212 of FIG. 2. For example, the software upgrade assistant 202 may request dependencies, or pre-requites, for Global Elevator Control Board—Version 2 (GECB-V2) application software from the component(s) dependency data 212. The component(s) dependency data 212 may indicate that this software is dependent on a GECB-V2 boot loader or secondary loader being installed on the elevator controller 224. This example is intended to be exemplary in nature as one skilled in the art will recognize that numerous other software dependency combinations may exist and be tracked by embodiments.

Block 320 is performed and an error message is output to the requestor if the pre-requisite software is not installed on the elevator controller. In an embodiment, an indicator of the missing software pre-requisite(s) may also be output to the requestor. In an embodiment the requestor is prevented from initiating the software upgrade. In another embodiment, the requestor is warned but not prevented from initiating the software upgrade.

Block 308 is performed if the pre-requisite software is installed on the elevator controller or component or the requestor decides to proceed despite the warning from block 320. At block 308, software upgrade completion time is predicted, based for example on the predicted average software upgrade completion time data 222 of FIG. 2. At block 310, elevator idle time is predicted, based for example on the predicated elevator idle time data 220 of FIG. 2.

The predicted software upgrade completion time and elevator idle time are used at block 312 to determine suggested software upgrade timeframes. In an embodiment, the software upgrade assistant looks for idle timeframes that are at least as long as the software upgrade completion times (and in an embodiment over by a threshold number of minutes or over by a percentage of software upgrade completion time). In an embodiment, the suggested timeframe is further based at least in part on a software upgrade request from another requestor to ensure that the software upgrades don't overlap in time if they would conflict with each other. In an embodiment, the suggested timeframe is further based at least in part on planned activities in a building where the elevator is located which can be identified by querying the building planned activities data 208 of FIG. 2. In an embodiment, the determining a suggested timeframe is further based at least in part on a current health status of the components which can be received via the elevator health status interface 216 of FIG. 2.

As shown in FIG. 3, the suggested timeframes for the software upgrade are output to the requestor at block 314, and at block 316, the predicted upgrade completion time is also output. At block 318, the software upgrade is automatically scheduled, or initiated by a remote elevator technician, for one of the suggested timeframes.

In an embodiment, the software upgrade is dependent on a hardware element being installed in a component of the elevator and/or in the elevator controller. In an embodiment, the hardware pre-requisite(s) for the software upgrade is determined by querying the component(s) dependency data 212 of FIG. 2. For example, the software upgrade may be dependent on a common platform interface board (CPIB), a low voltage power board (LVPB), and/or a resistance based inspection (RBI) device being installed. This example is intended to be exemplary in nature as one skilled in the art will recognize that numerous other software and hardware dependency combinations may exist and be tracked by embodiments.

While the above description has described the flow of FIG. 3 in a particular order, it should be appreciated that unless otherwise specifically required in the attached claims that the ordering of the steps may be varied.

Figure 4:
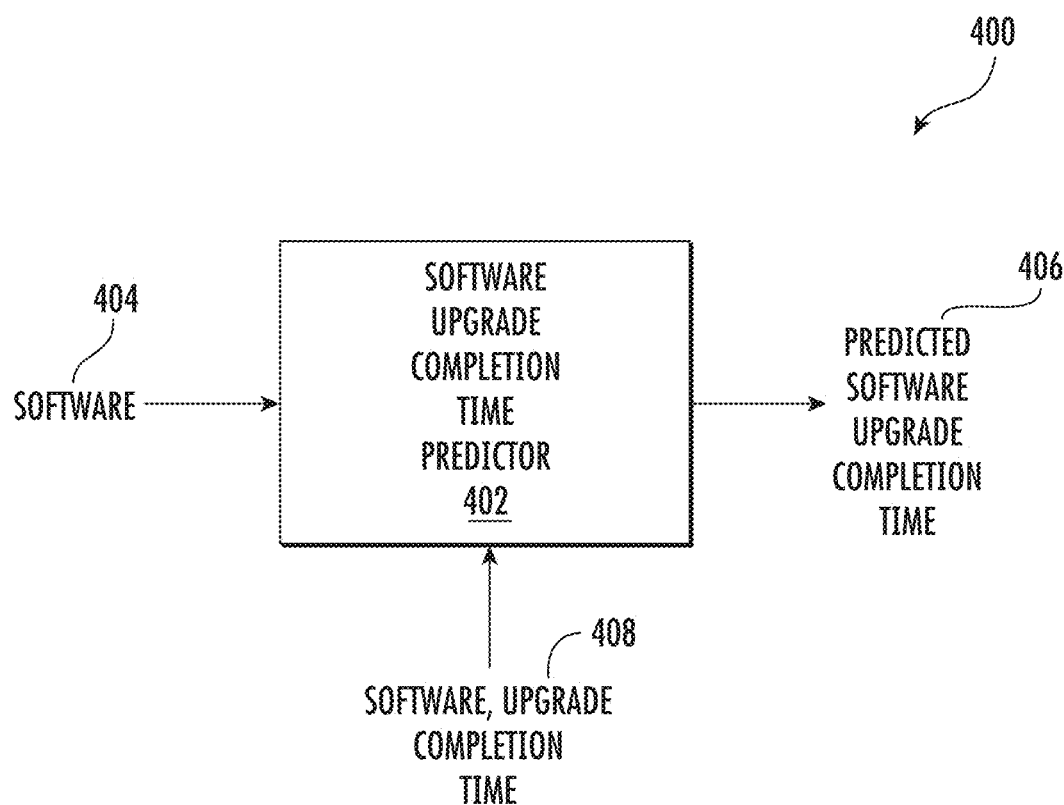
FIG. 4 is a block diagram of a software upgrade completion time predictor in accordance with one or more embodiments of the present disclosure.

Turning now to FIG. 4, a block diagram 400 of a software upgrade completion time predictor 402 is generally shown in accordance with one or more embodiments of the present disclosure. The software upgrade completion time predictor 402 receives a proposed software upgrade 404 as input and generates a predicted software upgrade completion time 406 as output for storage as predicted average software upgrade completion time data 222. In an embodiment, a software upgrade 404 may include multiple components, or software modules that require upgrading at the same time. In addition, the current environment (software and/or hardware) on the memory controller or elevator component may also be taken into account by the software upgrade completion time predictor 402 when predicting an upgrade completion time.

The software upgrade completion time predictor 402 is initially generated using machine learning techniques by inputting labeled software, upgrade completion time pairs 408 to train the model. The software upgrade completion time predictor 402 may be retrained periodically by tracking software upgrade completion times and inputting the results into the software upgrade completion time predictor 402 as retraining data. Performing the retraining allows the model to evolve as software upgrade completion times change due for example, to different environments and different hardware. Examples of training pairs include: (Sensor Software-V2, ten minutes) and (Service Call Software-V1, two minutes). This example is intended to be exemplary in nature as one skilled in the art will recognize that numerous other training pairs may exist and be input to the model.

Figure 5:
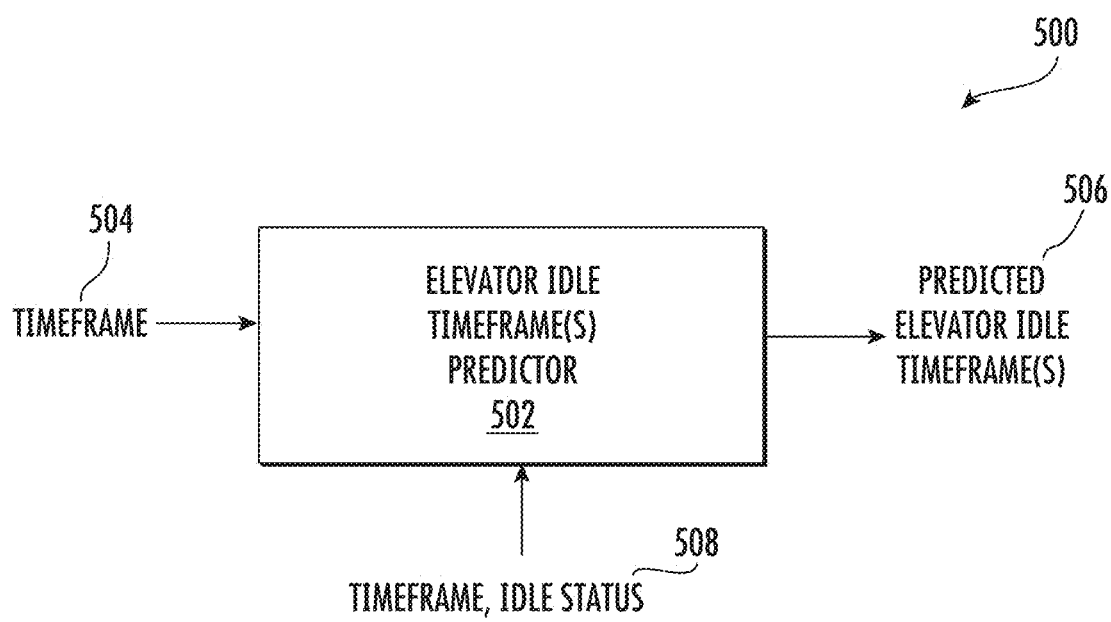
FIG. 5 is a block diagram of an elevator idle time predictor in accordance with one or more embodiments of the present disclosure.

Turning now to FIG. 5, a block diagram 500 of an elevator idle time predictor is generally shown in accordance with one or more embodiments of the present disclosure. The elevator idle timeframe(s) predictor 502 receives a timeframe 504 as input and generates predicted elevator idle timeframe(s) 506 as output for storage as predicted elevator idle time data 220. In an embodiment, the predicted elevator idle time data 220 is calculated, or predicted, by the elevator idle timeframe(s) predictor 502 based on the history of all idle times of the elevator. The elevator idle timeframe(s) predictor 502 uses all available data of elevator idle times and predicts the next future idle timeframe(s) of the elevator. The predicated elevator idle timeframe(s) 506 can be in the next week, or the next month, or the next year and in an embodiment, the software upgrade can be triggered (e.g., by a remote elevator technician) to occur within the next available timeframe that is at least as long as the estimated time required to perform the software upgrade.

The elevator idle timeframe(s) predictor 502 is initially generated using machine learning techniques by inputting timeframe, idle status pairs 508 to train the model. The elevator idle timeframe(s) predictor 502 may be retrained periodically by data from the elevator, or elevator performance data. Performing the retraining allows the model to evolve as elevator usage changes over time.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system configured to provide an automatic software upgrade assistant, the system comprising:
   a processor; and
   a memory comprising computer-executable instructions that, when executed by the processor, cause the processor to perform operations, the operations comprising:
      receiving a request from a requestor to install a software upgrade on a controller of an elevator component, the software upgrade dependent on at least one software program being installed on the controller;
      determining whether the at least one software program is installed on the controller; and
      based at least in part on determining that the at least one software program is installed on the controller:
         predicting, based at least in part on a machine learning model built based at least in part on past elapsed times to complete installation of the software upgrade, an elapsed time to complete the installation of the software upgrade on the controller; and
         outputting, to the requestor, an indication that the software upgrade is permitted to be installed on the controller and the predicted elapsed time to complete the installation,
         wherein the machine learning model is trained by inputting labeled pairs that include software identifiers and upgrade completion times, and the machine learning model is periodically retrained by inputting additional labeled pairs that include software identifiers and actual upgrade times as tracked by the controller.

2. The system of claim 1, wherein the operations further comprise, based at least in part on determining that the at least one software program is installed on the controller:
   predicting an idle timeframe of an elevator comprising the elevator component;
   determining a suggested timeframe for performing the installation based at least in part on the idle time of the elevator; and
   outputting the suggested timeframe to the requestor.

3. The system of claim 2, wherein the predicting an idle timeframe of the elevator is based at least in part on a machine learning model built based at least in part on past idle timeframes of the elevator.

4. The system of claim 2, wherein the determining a suggested timeframe is further based at least in part on a software upgrade request from another requestor.

5. The system of claim 2, wherein the determining a suggested timeframe is further based at least in part on planned activities in a building where the elevator is located.

6. The system of claim 2, wherein the determining a suggested timeframe is further based at least in part on a current health status of the elevator component.

7. The system of claim 1, wherein the operations further comprise, based at least in part on determining that the at least one software program is not installed on the controller, outputting to the requestor, an indication that the software upgrade is not permitted to be installed on the controller.

8. The system of claim 1, wherein the operations further comprise, based at least in part on determining that the at least one software program is installed on the controller, initiating the software upgrade on the controller.

9. The system of claim 1, wherein the software upgrade is further dependent on at least one hardware element on the component or the controller.

10. A method of providing an automatic software upgrade assistant, the method comprising:
    receiving a request from a requestor to install a software upgrade on a controller of an elevator component, the software upgrade dependent on at least one software program being installed on the controller;
    determining whether the at least one software program is installed on the controller; and
    based at least in part on determining that the at least one software program is installed on the controller:
       predicting, based at least in part of a machine learning model built based at least in part on past elapsed times to complete installation of the software upgrade, an elapsed time to complete the installation of the software upgrade on the controller; and
       outputting, to the requestor, an indication that the software upgrade is permitted to be installed on the controller and the predicted elapsed time to complete the installation,
       wherein the machine learning model is trained by inputting labeled pairs that include software identifiers and upgrade completion times, and the machine learning model is periodically retrained by inputting additional labeled pairs that include software identifiers and actual upgrade times as tracked by the controller.

11. The method of claim 10, further comprising, based at least in part on determining that the at least one software program is installed on the controller:
    predicting an idle timeframe of an elevator comprising the elevator component;
    determining a suggested timeframe for performing the installation based at least in part on the idle time of the elevator; and
    outputting the suggested timeframe to the requestor.

12. The method of claim 11, wherein the predicting an idle timeframe of the elevator is based at least in part on a machine learning model built based at least in part on past idle timeframes of the elevator.

13. The method of claim 11, wherein the determining a suggested timeframe is further based at least in part on a software upgrade request from another requester.

14. The method of claim 11, wherein the determining a suggested timeframe is further based at least in part on planned activities in a building where the elevator is located.

15. The method of claim 11, wherein the determining a suggested timeframe is further based at least in part on a current health status of the elevator component.

16. The method of claim 10, further comprising, based at least in part on determining that the at least one software program is not installed on the controller, outputting to the requestor, an indication that the software upgrade is not permitted to be installed on the controller.

17. The method of claim 10, further comprising, based at least in part on determining that the at least one software program is installed on the controller, initiating the software upgrade on the controller.

18. The method of claim 10, wherein the software upgrade is further dependent on at least one hardware element on the component or the controller.

* * * * *